United States Patent
Tiesler et al.

(10) Patent No.: US 7,137,923 B2
(45) Date of Patent: Nov. 21, 2006

(54) MULTIPLE GEAR STAGE AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 54 days.

(21) Appl. No.: 10/930,612

(22) Filed: Aug. 31, 2004

(65) Prior Publication Data
US 2005/0054474 A1    Mar. 10, 2005

(30) Foreign Application Priority Data
Sep. 4, 2003    (DE)    ................. 103 40 730

(51) Int. Cl.
F16H 3/62    (2006.01)
(52) U.S. Cl. .............. 475/276; 475/275; 475/282; 475/283; 475/286; 475/287; 475/290; 475/291
(58) Field of Classification Search ........... 475/275, 475/276, 279, 280, 281, 282, 283, 284, 285, 475/286, 287, 290, 291, 296, 297
See application file for complete search history.

(56) References Cited

U.S. PATENT DOCUMENTS

| 3,776,066 A | 12/1973 | Piret |
| 3,977,272 A | 8/1976 | Neumann |
| 4,070,927 A | 1/1978 | Polak |
| 4,395,925 A | 8/1983 | Gaus |
| 4,732,253 A | 3/1988 | Hiramatsu et al. |
| 4,939,955 A | 7/1990 | Sugano |
| 5,106,352 A | 4/1992 | Lepelletier |
| 5,232,411 A | 8/1993 | Hayashi et al. |
| 5,250,011 A | 10/1993 | Pierce |
| 5,295,924 A | 3/1994 | Beim |
| 5,308,295 A | 5/1994 | Michioka et al. |
| 5,435,792 A | 7/1995 | Justice et al. |
| 5,439,088 A | 8/1995 | Michioka et al. |
| 5,460,579 A | 10/1995 | Kappel et al. |
| 5,520,588 A | 5/1996 | Hall, III |
| 5,533,945 A | 7/1996 | Martin et al. |
| 5,536,220 A | 7/1996 | Martin |
| 5,542,889 A | 8/1996 | Pierce et al. |
| 5,647,816 A | 7/1997 | Michioka et al. |
| 5,735,376 A | 4/1998 | Moroto et al. |
| 6,139,463 A | 10/2000 | Kasuya et al. |
| 6,471,616 B1 | 10/2002 | Stevenson |
| 6,558,287 B1 | 5/2003 | Hayabuchi et al. |
| 6,572,507 B1 | 6/2003 | Korkmaz et al. |

(Continued)

FOREIGN PATENT DOCUMENTS

DE    26 19 895    11/1976

(Continued)

Primary Examiner—Rodney H. Bonck
Assistant Examiner—David D. Le
(74) Attorney, Agent, or Firm—Davis & Bujold, P.L.L.C.

(57) ABSTRACT

A multiple gear transmission having a drive shaft (1) and a driven shaft (2), three planetary gear sets (P1, P2, P3), seven rotatable shafts (1, 2, 3, 4, 5, 6, 7) and seven shifting elements (03, 04, 05, 06, 14, 37, 57) comprising four brakes (03, 04, 05, 06) and three clutches (14, 37, 57). Selective engagement of the seven shifting elements (03, 04, 05, 06, 14, 37, 57) produce, from the drive supplied by the drive shaft (1) via the three planetary gear sets (P1, P2, P3), the seven rotatable shafts (1, 2, 3, 4, 5, 6, 7) and the driven shaft (2), different reduction ratios for seven or eight forward gears and one reverse gear.

29 Claims, 4 Drawing Sheets

U.S. PATENT DOCUMENTS

| | | |
|---|---|---|
| 6,634,980 B1 | 10/2003 | Ziemer |
| 6,723,018 B1 | 4/2004 | Hayabuchi et al. |
| 6,988,972 B1 * | 1/2006 | Usoro et al. ................. 475/275 |
| 2002/0091032 A1 | 7/2002 | Hayabuchi et al. |
| 2002/0183160 A1 | 12/2002 | Kao et al. |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |
| 2005/0272553 A1 * | 12/2005 | Raghavan et al. ........... 475/286 |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 102 00 379 A1 | 8/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 4290649 | 10/1992 |
| JP | 8200456 | 8/1996 |
| JP | 10259861 | 9/1998 |
| JP | 2000240741 | 9/2000 |
| JP | 2001082555 | 3/2001 |
| JP | 2002323098 | 11/2002 |
| WO | WO-96/01381 | 1/1996 |

* cited by examiner

| Grading | 1.61 | 1.55 | 1.44 | 1.21 | 1.26 | 1.17 | 1.1 | Spread | | 7 | |
|---|---|---|---|---|---|---|---|---|---|---|---|
| i-Gear | 7 | 4.35 | 2.8 | 1.94 | 1.61 | 1.28 | 1.1 | 1 | 8 | -7.24 | -4,51 |
| SE\Gg | 1 | 2 | 3 | 4 | 5 | 6 | 7 | | | R1 | R2 |
| 03 | X | X | X | | | | | | | | |
| 04 | | | | | | | | | | X | X |
| 13 | | X | | X | | X | X | X | | | |
| 15 | | | X | X | X | X | | | X | | X |
| 46 | | | | | X | X | X | X | X | X | |
| 56 (IAK) | X | | | | | | | | | X | |

MULTIPLE GEAR STAGE AUTOMATIC TRANSMISSION

This application claims priority from German Application Serial No. 103 40 730.8 filed Sep. 4, 2003.

FIELD OF THE INVENTION

The invention relates to a multiple gear transmission in planetary design, especially for an automatic transmission of a motor vehicle.

BACKGROUND OF THE INVENTION

According to the prior art, especially for motor vehicles, automatic transmissions comprise planetary gear sets shifted by means of frictional and shifting elements like clutches and brakes and are usually connected with a starting element such as a hydrodynamic torque converter or a fluid clutch liable to a slip effect and optionally provided with a lock-up clutch.

Such a transmission results from EP 0 434 525 A1. Essentially, it comprises one drive shaft and one driven shaft disposed in parallel, one double planetary gear set located concentrically to the drive shaft and five shifting elements in the form of three clutches and two brakes, the optional locking of which by pairs determines different gear ratios between the drive shaft and the driven shaft. This transmission has one front-mounted gear set and two power paths so that by selective engagement by pairs of the five shifting elements six forward gears are obtained.

In the first power path, two clutches are needed here to transmit the torque from the front-mounted gear set to two elements of the double planetary gear set. These are situated in power flow direction essentially behind the front-mounted gear set toward the double planetary gear set. In the second power path, one other clutch is provided which detachably connects them with another element of the double planetary gear set. The clutches are here disposed so that the inner disc carrier forms the output.

From the publication U.S. Pat. No. 6,139,463 a compact multiple gear transmission in planetary design is further known, especially for a motor vehicle, which has two planetary gear sets and one front-mounted gear set, the same as three clutches and two brakes. In this known multiple gear transmission, two clutches C-1 and C-3 are provided in a first power path for transmitting the torque from the front-mounted gear set to the two planetary gear sets. The outer disc carrier, the cylinder or piston and the pressure-compensation sides of the clutch C-3 are here respectively connected with one first brake B-1. Besides, the inner disc carrier of the third clutch C-3 is connected with the cylinder or piston and pressure-compensation sides of the first clutch C-1, the inner disc carrier of the first clutch C-1 being located on the output side and connected with a sun gear of the third planetary gear set.

From the Applicant's DE 199 49 507 A1 is also known a multiple gear transmission where two non-shiftable front-mounted gear sets on the drive shaft are provided which produce two rotational speeds on the output side which, together with the rotational speeds of the drive shaft, can optionally be shifted to the shiftable double planetary gear set acting upon the driven shaft by selective closing of the shifting elements used in a manner, such that to change from one gear to the respective next following higher or lower gear, only one of the two precisely actuated shifting elements has to be engaged or disengaged.

From DE 199 12 480 A1 one automatically shiftable motor vehicle transmission is also known, having three one-spider planetary gear sets, the same as three brakes and two clutches, for shifting six forward gears and one reverse gear and having one drive shaft, the same as one driven shaft. The automatically shiftable motor vehicle transmission is designed so that the drive shaft is directly connected with the sun gear of the second planetary gear set and that the drive shaft can be connected via the first clutch with the sun gear of the first planetary gear set and/or via the second clutch with the spider of the first planetary gear set. Additionally or alternatively, the sun gear of the first planetary gear set can be connected via the first brake with the housing of the transmission and/or the spider of the first planetary gear set via the second brake with the housing and/or the sun gear of the third planetary gear set via the third brake with the housing.

From DE 102 13 820 A1 a multiple gear automatic transmission is further known comprising one first input lane T1 of a first reduction ratio; one input lane T2 having a higher reduction ratio than said input lane T1; one planetary gear set with four elements which are one first element, one second element, one third element and one fourth element in the sequence of elements in a rotational speed diagram; one clutch C2 which transmits a rotation from the input lane T2 to the first element S3; one clutch C-1 which transmits a rotation from the input lane T2 to the fourth element S2; one clutch C-4 which transmits a rotation from the input lane T1 to the first element; one clutch C-3 which transmits the rotation from the input lane T1 to the second element C3; one brake B-1 which produces the engagement of the fourth element; one brake B-2 which produces the engagement of the second element; and one output element which is coupled with the third element R3.

Within the scope of the Applicant's DE 101 15 983 A1 a multiple gear transmission is described, having one drive shaft connected with a front-mounted set, one driven shaft connected with a rear-mounted shifting set and with a maximum of seven shifting elements by optional shifting of which at least seven forward gears can be shifted without group shift. The front-mounted set is formed by one front-mounted planetary set or at most two non-shiftable front-mounted planetary gear sets coupled with the first front-mounted planetary gear set wherein the rear-mounted set is designed as two-spider four-shaft transmission with two shiftable rear-mounted planetary gear sets and has four free shafts. The first free shaft of this two-spider four-shaft transmission is connected with the first shifting element, the second free shaft with the second and third shifting elements, the third free shaft with the fourth and fifth shifting elements and the fourth free shaft with the driven shaft. For a multiple gear transmission having a total of six shifting elements, it is inventively proposed to connect the third free shaft or the first free shaft of the rear-mounted set additionally with a sixth shifting element. For a multiple gear transmission having a total of seven shifting elements, it is inventively additionally proposed to connect the third free shaft with a sixth shifting element (D') and the first free shaft with a seventh shifting element.

Within the scope of the Applicant's DE 101 15 987, a multiple gear transmission has also been described having at least seven gears. The transmission comprises, together with the drive shaft and the driven shaft, one non-shiftable front-mounted gear set and one shiftable rear-mounted gear set in the form of a two-spider four-shaft transmission. The front-mounted gear set consists of one first planetary gear set which, together with the input rotational speed of the drive shaft, offers a second rotational speed which can optionally be shifted to a rear-mounted gear set. The rear-mounted gear set is comprised of two shiftable planetary gear sets which, with the six shifting elements, can engage at least seven gears, two power paths being formed. At the same time, group shifts are always advantageously prevented during each shifting operation. One 9-gear multiple gear transmission has also been disclosed in DE 29 36 969; it comprises eight shifting elements and four gear sets.

Automatically shiftable vehicle transmissions in planetary design have often been described already in the prior art and can be an object of constant further development and improvement. Thus the transmissions must have sufficient number of forward gears, the same as one reverse gear and a ratio very well suited to motor vehicles having a high total spreading and favorable ratio ranges. They must also make a high starting ratio in forward direction and contain a direct gear possible, the same as is adequate for utilization in both passenger cars and in commercial vehicles. Besides, said transmission must have a low construction cost, especially require a small number of shifting elements and during sequential shifting mode prevent double shifts so that during gear shifts in defined gear groups only one shifting element be changed each time.

The problem on which this invention is based is to propose a multiple gear transmission of the kind mentioned above in which the construction cost is optimized and in addition the efficiency degree in the main drive gears is improved with regard to towing and gearing losses. Besides, in the inventive multiple gear transmission low torques act upon the shifting elements and planetary gear sets, the same as the rotational speeds of the shafts, shifting elements and planetary gear sets are kept as low as possible. In addition, the number of gears and the transmission spreading are increased so that seen or eight forward gears and at least one reverse gear can be advantageously implemented. The inventive transmission must also be fit for any design in a vehicle, especially for a front-transverse arrangement.

SUMMARY OF THE INVENTION

An inventive multiple gear transmission in planetary design is accordingly proposed which has one drive shaft and one driven shaft located in one housing. In addition, at least three planetary gear sets, at least six rotatable shafts and at least six shifting elements including two brakes and four clutches are provided, the selective engagement of which by pairs produces different reduction ratios between the drive shaft and the driven shaft so that preferably eight forward gears and at least one reverse gear can be implemented.

The drive shaft is here permanently connected with the ring gear of the first planetary gear set and connectable via one clutch with a fifth shaft which is connected with the sun gear of the second planetary gear set and connectable via one clutch with one sixth shaft, which sixth shaft is connected with the spider of the first planetary gear set and detachably connectable via one clutch with a fourth shaft which is permanently connected with the ring gear of the third planetary gear set and the spider of the second planetary gear set and attachable to the housing via one brake, the driven shaft is connected with the spider of the third planetary gear set. One third shaft is also permanently connected on one side with the sun gear of the third planetary gear set and the ring gear of the second planetary gear set, detachably connectable via one clutch with the drive shaft and attachable to the housing via one brake; the sun gear of the first planetary gear set is, according to the invention, non-rotatably connected with the housing via one other shaft.

By the inventive development of the multiple gear transmission adequate ratios result for passenger cars, the same as a considerable increase of total spreading of the multiple gear transmission whereby the driving comfort is improved and the consumption significantly lowered.

The inventive multiple gear transmission is suitable for any motor vehicle, in particular for passenger cars and for commercial vehicles such as wagons, autobuses, construction vehicles, rail vehicles, chain tractor vehicles and the like.

With the inventive multiple gear transmission, a small number of shifting elements, preferably four brakes and three clutches, further considerably reduces the construction cost. It is advantageously possible with the inventive multiple gear transmission to start with a hydrodynamic torque converter, an external starting clutch or also any adequate external starting element. It is also conceivable to make a starting operation possible with a starting element integrated in the transmission. Preferably adequate is a shifting element actuated in the low gears and in the reverse gear.

With the multiple gear transmission invention, there also results a good degree of efficiency in the main drive gears relative to towing and gearing losses.

Besides, torques in the shifting elements and in the planetary gear sets of the multiple gear transmission are low whereby the wear in the multiple gear transmission is advantageously reduced. The low torques further make a correspondingly small dimensioning possible whereby the needed installation space and attendant costs are reduced. In addition, the rotational speeds in the shafts, the shifting elements and the planetary gear sets are low.

BRIEF DESCRIPTION OF THE DRAWINGS

The invention will now be described, by way of example, with reference to the accompanying drawings in which.

DETAILED DESCRIPTION OF THE INVENTION

Figure 1:
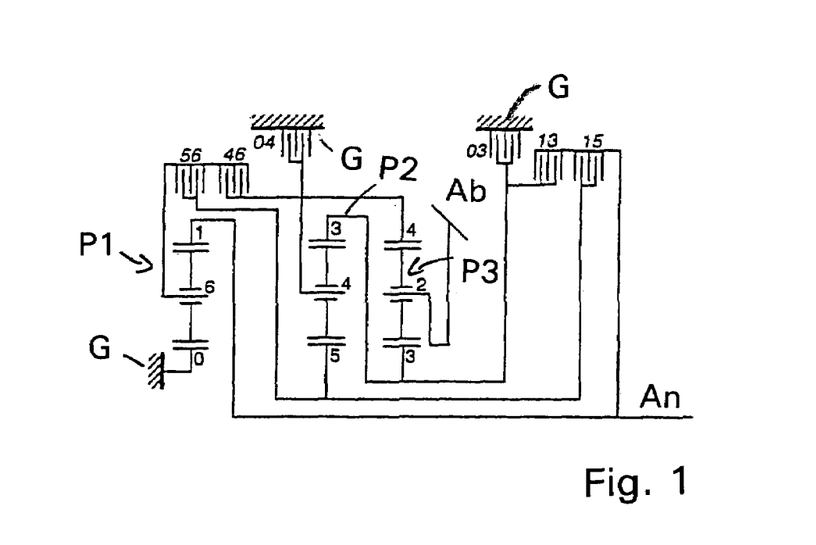
FIG. 1 is a diagrammatic view of a preferred embodiment of an inventive multiple gear transmission adequate for a front-transverse design.

In FIG. 1 is shown an inventive multiple gear transmission having one drive shaft 1 (An) and one driven shaft 2 (Ab) located in one housing G. Three planetary gear sets P1, P2, P3 are provided. The planetary gear sets P1, P2, P3 are preferably designed as minus planetary gear sets; the first planetary gear set serves as front-mounted gear sets and the planetary gear sets P2, P3 are coupled with each other.

As can be seen from FIG. 1, only six shifting elements are provided, namely, two brakes 03, 04 and four clutches 13, 15, 46 and 56.

A selective shifting of seven or eight forward gears and preferably two reverse gears can be implemented with the shifting elements, two shifting elements being always engaged. The inventive multiple gear transmission has a total of six rotatable shafts, namely, the shafts 1, 2, 3, 4, 5 and 6.

It is inventively provided in the multiple gear transmission according to FIG. 1 that the input results by the shaft 1 which is permanently connected with the ring gear of the first planetary gear set P1 and connectable via one clutch 15 with the shaft 5 which is connected with the sun gear of the second planetary gear set P2 and via the clutch 56 connectable with the shaft 6 which, on one side, is connected with the spider of the first planetary gear set P1 and, on the other side, detachably connectable via one clutch 46 with a shaft 4 which is permanently connected with the ring gear of the third planetary gear set P3 and the spider of the second planetary gear set P2. Besides, the shaft 4 is attachable to the housing G via one brake 04. The clutches 56 and 46 are here preferably disposed side by side. Within the scope of a preferred embodiment, they have a common outer disc carrier situated on the input side. The clutch 46 is preferably situated in power flow direction behind the clutch 56.

The drive shaft 1 is also detachably connectable via one clutch 13 with the shaft 3 which is attachable to the housing G via one brake 03 and is connected with the sun gear of the third planetary gear set P3 and the ring gear of the second planetary gear set P2. The clutches 13 and 15 are likewise preferably disposed side by side and can have one outer disc carrier located on the input side. The clutch 13 is preferably located in power flow direction behind the clutch 15.

The output results via the shaft 2 which is connected with the spider of the third planetary gear set P3. The sun gear of the first planetary gear set P1 is non-rotatably connected via one shaft 0 with the housing G.

The spatial arrangement of the shifting elements can be arbitrary and limited only by dimensions and outer molding. As is to be understood from FIGS. 1 and 2, the clutches 56, 46, 13, 15, radially observed, are preferably situated approximately above the planetary gear sets, other arrangements being also possible.

Figure 2:
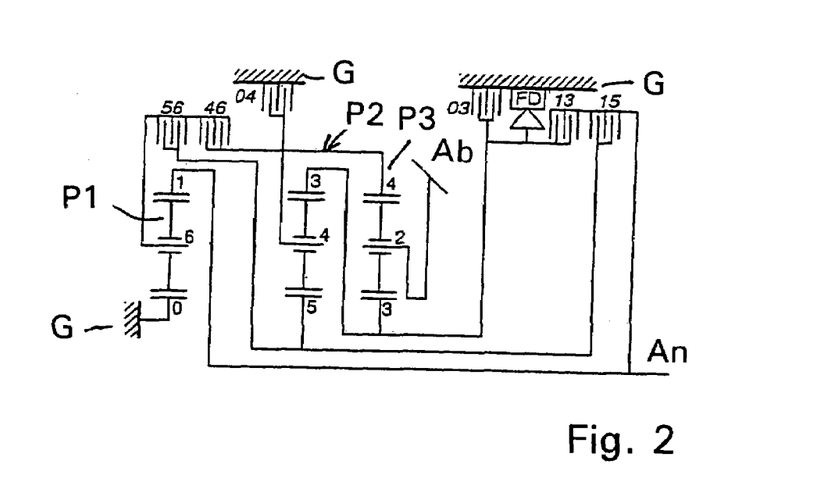
FIG. 2 is a diagrammatic view of a preferred embodiment of an inventive multiple gear transmission having one free wheel.

The embodiment, according to FIG. 2, differs from the embodiment according to FIG. 1 in that one free wheel FD is provided parallel with the brake 03. High supporting torques can be reduced thereby.

Figure 3:
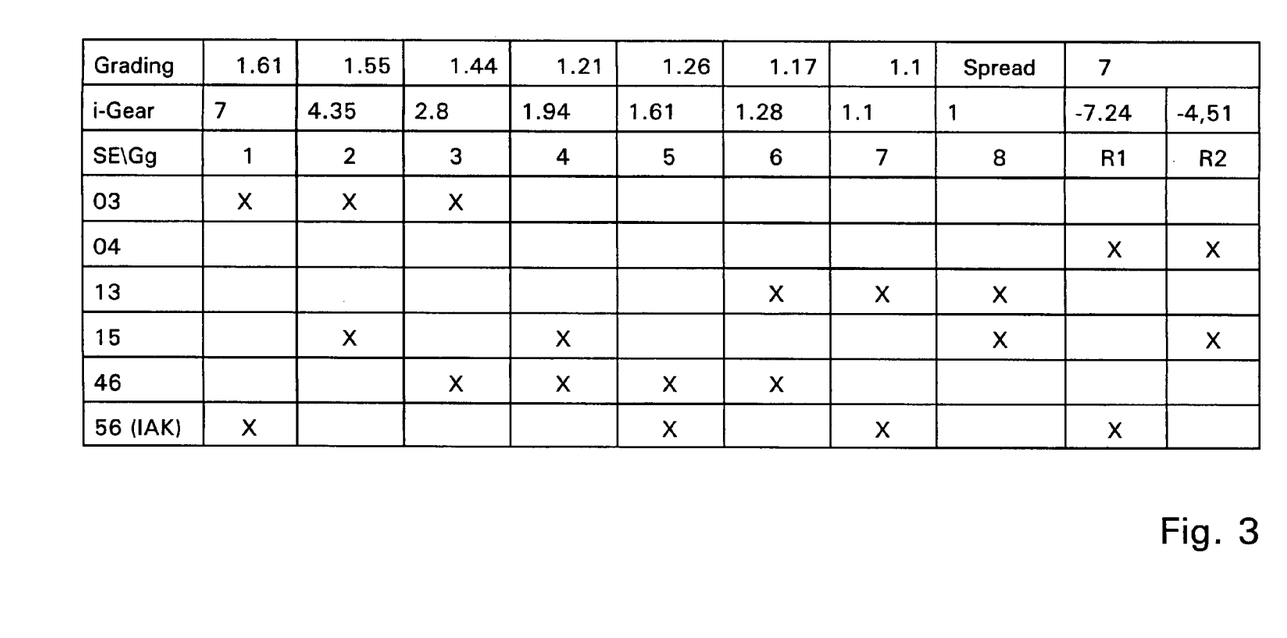
FIG. 3 is a switch system by way of example for the inventive multiple gear transmission according to FIGS. 1 and 2.

In FIG. 3 is shown, by way of example, a switch system of the inventive multiple gear transmission according to FIGS. 1 and 2. Two shifting elements are closed for each gear. From the switch system can be deduced, by way of example, the respective ratios i of the individual gear steps and the ratio ranges to be determined therefrom. It can further be deduced from the switch system that, in sequential shifting mode, double gear shifts are prevented since two adjacent gear steps use one shifting element in common. As is to be inferred from the switch system, it is also possible to skip gears without combined shift. The eighth gear is preferably designed as a direct gear, the ratio ranges in the upper gears being small. This switch system is especially adequate for passenger cars. The transmission can also be designed as seven-gear transmission when the seventh gear is omitted so that the ratio ranges 1.28 and 1.1 are combined.

The brake 03 is always engaged for the first three gears. Additionally engaged are the clutch 56 for the first gear, the clutch 15 for the second gear and the clutch 46 for the third gear. The clutch 46 is always engaged for the gears four, five and six. Also engaged are the clutch 15 for fourth gear, the clutch 56 for fifth gear and the clutch 13 for sixth gear. The seventh gear results by engaging the clutches 13 and 56 and the eighth gear by engaging the clutches 13 and 15; for the first reverse gear, the brake 04 and the clutch 56 and, for the second reverse gear, the brake 04 and the clutch 15, are engaged.

It is possible, according to the invention, to start with an integrated shifting element (IAK). The clutch 56 is especially suited for this, since it is used without reversal of direction of rotation in the first gear and first reverse gear. The high ratio of the first reverse gear results in good switchability; a reversal between gears is further possible without compound gear shift being advantageous for safety vehicles. In order that the brake 04 needs not to be made large, a torque reduction greater for the reverse gear than for the second gear is convenient.

According to the invention with the same transmission diagram, pursuant to shifting logic, different gear ratios can result so that a variation specific to utilization and vehicle is made possible.

Figure 9:
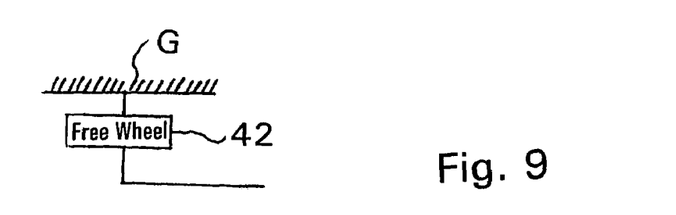
FIG. 9 is a diagrammatic view of an embodiment of the inventive multiple gear transmission having a free wheel.

Besides, it is possible to provide a conventional free wheel 42 on each adequate place of the multiple gear transmission, for example as shown in FIG. 9, between one shaft and the housing G or in order to connect two shafts, should that be the case.

Figure 4:
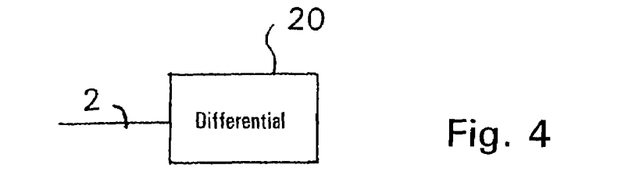
FIG. 4 is a diagrammatic view of an embodiment of the output of the inventive multiple gear transmission having a differential.

According to the invention, as shown in FIG. 4, one axle differential and/or one transfer differential 20 can be situated on the input side or on the output side.

Figure 5:
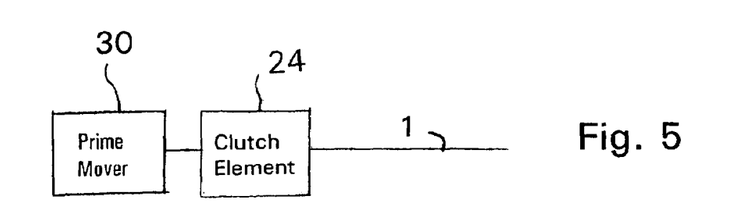
FIG. 5 is a diagrammatic view of an embodiment of the inventive multiple gear transmission with a clutch and a prime mover.
Figure 6:
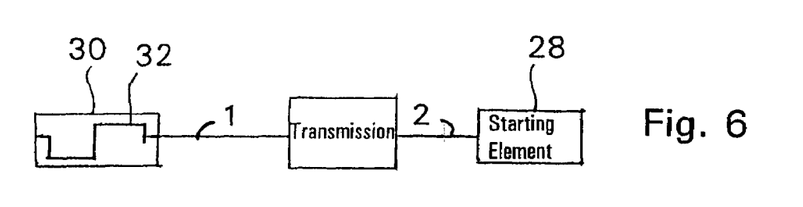
FIG. 6 is a diagrammatic view of an embodiment of the inventive multiple gear transmission having the transmission located between a starting element and a prime mover.

Within the scope of an advantageous development, as shown in FIG. 5, the drive shaft 1 can be separated, as needed, from a prime mover 30 by a clutch element 24, it being possible to uses, as the clutch element 24, a hydrodynamic converter, a hydraulic clutch, a dry starting clutch, a wet starting clutch, a magnetic powder clutch, or a centrifugal force clutch. As shown in FIG. 6, it is also possible to situate a starting element 28 in a power flow direction behind the transmission, the drive shaft 1 being, in this case, permanently connected with the crankshaft 32 of the engine or the prime mover 30.

Figure 7:
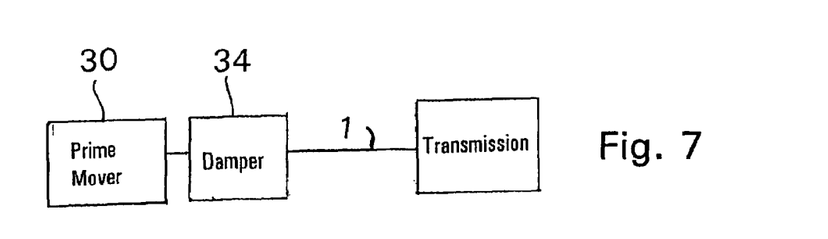
FIG. 7 is a diagrammatic view of an embodiment of the inventive multiple gear transmission having a prime mover and a damper.

The inventive multiple gear transmission, as shown in FIG. 7, makes situating a torsional vibration damper 34 between engine or the prime mover 30 and the transmission possible.

Figure 8:
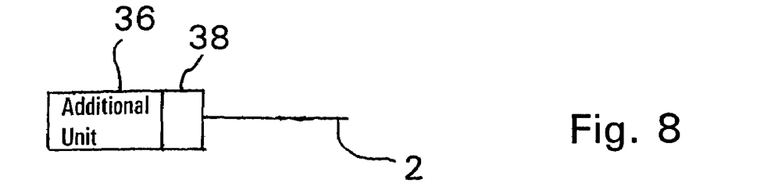
FIG. 8 is a diagrammatic view of an embodiment of the inventive multiple gear transmission with a power take off for an additional unit.
Figure 11:
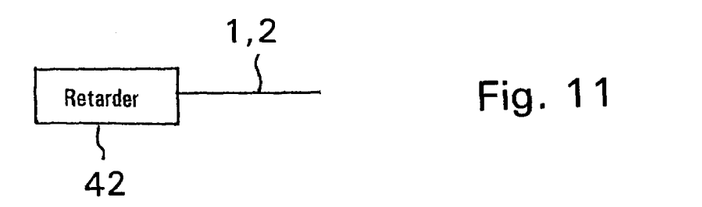
FIG. 11 is a diagrammatic view of a preferred design of the inventive multiple gear transmission having a retarder.

Within the scope of another embodiment of the invention, as shown in FIG. 11, it is possible upon each shaft, preferably upon the drive shaft 1 or the driven shaft 2, to situate a wear free brake such as a hydraulic or electric retarder 42 or the like, which is especially important for use in commercial vehicles. A power takeoff 38 for driving an additional unit 32, as shown in FIG. 8, can also be provided upon each shaft, preferably upon the drive shaft 1 or the driven shaft 2.

The shifting elements used can be designed as power shiftable clutches or brakes. There can be especially used force-locking clutches or brakes such as multi-disc clutches, band brakes and/or tapered clutches. As shifting elements can also be used to force-locking brakes and/or clutches like synchronizers or dog clutch.

Figure 10:
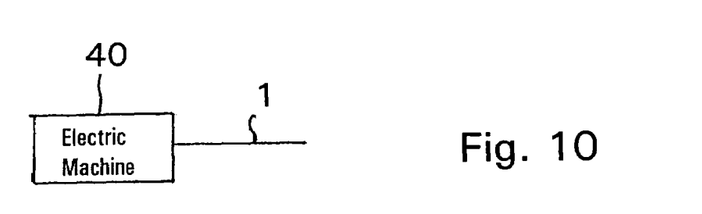
FIG. 10 is a diagrammatic view of an embodiment of the inventive multiple gear transmission with an electric machine.

Another advantage of the multiple gear transmission introduced here is that upon each shaft 1 an electric machine 40 can be mounted as generator and/or as added prime mover, as shown in FIG. 10.

Every structural design, especially every spatial arrangement of the planetary gear sets and of the shifting elements per se or with each other and as far as technically convenient, evidently falls also under the scope of protection of the instant claims without affecting the operation of the transmission such as indicated in the claims even if said designs have not be explicitly shown in the figures or in the description.

| Reference numerals | |
|---|---|
| 0 shaft | 03 brake |
| 1 shaft | 04 brake |
| 2 shaft | 13 clutch |
| 3 shaft | 15 clutch |
| 4 shaft | 46 clutch |
| 5 shaft | 56 clutch |
| 6 shaft | An input |
| P1 planetary gear set | Ab output |
| P2 planetary gear set | i ratio |
| P3 planetary gear set | G housing |
| IAK integrated shifting element | FD free wheel |

The invention claimed is:

1. A multiple gear transmission of a planetary design, for an automatic transmission of motor vehicle, comprising a drive shaft (1) and a driven shaft (2) located in a housing (G),
first, second and third planetary gear sets (P1, P2, P3),
third, fourth, fifth and sixth rotatable shafts (1, 2, 3, 4, 5, 6) and a first, second, third, fourth, fifth and sixth shifting elements (03, 04, 13, 15, 46, 56), the shifting elements including first and second brakes (03, 04) and first, second, third and fourth clutches (13, 15, 46, 56), and selective engagement of the six shifting elements (03, 04, 13, 15, 46, 56) produces different reduction ratios between the drive shaft (1) and the driven shaft (2) so that up to eight forward gears and at least one reverse gear can be implemented,
the drive shaft (1) is permanently connected with a ring gear of the first planetary gear set (P1) and connectable, via the second clutch (15), with the fifth shaft (5) which is connected with a sun gear of the second planetary gear set (P2) and connectable with the sixth shaft (6), via the fourth clutch (56),
the sixth shaft (6) is connected, adjacent one end, with a spider of the first planetary gear set (P1) and adjacent a second end, detachably connectable, via the third clutch (46), with the fourth shaft (4) which is permanently connected with a ring gear of the third planetary gear set (P3) and a spider of the second planetary gear set (P2) and attachable, via the second brake (04), to the housing (G),
the driven shaft (2) is connected with a spider of the third planetary gear set (P3),
the third shaft (3) is permanently connected with a sun gear of the third planetary gear set (P3) and a ring gear of the second planetary gear set (P2), and the third shaft (3) is detachably connectable, via the first clutch (13), with the drive shaft (1) and attachable, via the first brake (03), to the housing (G), and
a sun gear of the first planetary gear set (P1) is non-rotatably connected via a seventh shaft (0) with the housing (G).

2. The multiple gear transmission according to claim 1, wherein the forward gears are shiftable so that when changing from one forward gear to one of a next sequentially higher or a next sequentially lower gear, only one previously engaged shifting element is disengaged and only one previously unengaged shifting element is engaged.

3. The multiple gear transmission according to claim 1, wherein for each of the forward gears and for the reverse gear, two shifting elements are respectively engaged.

4. The multiple gear transmission according to claim 1, wherein the transmission has eight forward gears and for the first forward gear the first and the sixth shifting elements (03, 56) are engaged, for the second forward gear the first and the fourth shifting element (03, 15) are engaged, for the third forward gear the first and the fifth shifting elements (03, 46) are engaged, for the fourth forward gear the fourth and the fifth shifting elements (15, 46) are engaged, for the fifth forward gear the fifth and the sixth shifting elements (46, 56) are engaged, for the sixth forward gear the third and the fifth shifting elements (13, 46) are engaged, for the seventh forward gear the third and the sixth shifting elements (13, 56) are engaged and for the eighth forward gear the third and the fourth shifting elements (13, 15).

5. The multiple gear transmission according to claim 1, wherein for the at least one reverse gear, the second brake (04) and one of the second and the fourth clutches (15, 56) is engaged.

6. The multiple gear transmission according to claim 1, wherein at least one of the first and the second clutches (13, 15) and the third and the fourth clutches (46, 56) are located adjacent one another.

7. The multiple gear transmission according to claim 1, wherein at least one of the first and the second clutches (13, 15) and the third and the fourth clutches (46, 56) have one common outer disc carrier.

8. The multiple gear transmission according claim 1, wherein at least one of an outer disc carrier of the first and the second clutches (13, 15) and an outer disc carrier of the third and the fourth clutches (46, 56) are situated on an input side of the transmission.

9. The multiple gear transmission according to claim 1, wherein the first, the second and the third planetary gear sets (P1, P2, P3) are minus planetary gear sets.

10. The multiple gear transmission according to claim 1, wherein a free wheel is placed in the transmission.

11. The multiple gear transmission according to claim 1, wherein an input and an output are both located on one side of the housing.

12. The multiple gear transmission according to claim 1, wherein at least one of an axle differential and a transfer differential is located on an input side or an output side.

13. The multiple gear transmission according to claim 1, wherein a torsional vibration damper is situated between a prime mover and the transmission.

14. The multiple gear transmission according to claim 1, wherein a wear-free brake is placed upon at least one of the drive shaft, the driven shaft, the third, the fourth, the fifth, the sixth and the seventh shafts.

15. The multiple gear transmission according to claim 1, wherein a power takeoff is situated upon at least one of said shafts for driving additional unit.

16. The multiple gear transmission according to claim 1, wherein a power takeoff is placed upon one of the drive shaft (1) and the driven shaft (2).

17. The multiple gear transmission according to claim 1, wherein at least one of force-locking brakes and clutches are provided as the shifting elements.

18. The multiple gear transmission according to claim 1, wherein upon at least one of the drive shaft (1), the driven shaft (2), the third, the fourth, the fifth and the sixth rotatable shafts (1, 2, 3, 4, 5, 6), an electric machine is mounted, and the electric machine functions as one of a generator and an additional prime mover.

19. The multiple gear transmission according to claim 1, wherein, when radially observed, one of the first and the second clutches (13, 15) and the third and the fourth clutches (46, 56) are positioned radially further away from a rotational axis of the transmission than the first, the second and the third planetary gear sets (P1, P2, P3).

20. The multiple gear transmission according to claim 1, wherein, first and second reverse gears are shiftable.

21. The multiple gear transmission according to claim 20, wherein during a change from the first reverse gear to the second reverse gear, only one previously engaged shifting element is disengaged and one previously unengaged shifting element is engaged.

22. The multiple gear transmission according to claim 1, wherein the drive shaft (1) is separated from a prime mover by a clutch element.

23. The multiple gear transmission according to claim 22, wherein the clutch element is one of a hydrodynamic converter, a hydraulic clutch, a dry starting clutch, a wet starting clutch, a magnetic powder clutch and a centrifugal force clutch.

24. The multiple gear transmission according to claim 23, wherein an external starting element is situated in a power flow direction downstream of the transmission, and the drive shaft (1) is fixedly connected with a crankshaft of the prime mover.

25. The multiple gear transmission according to claim 1, wherein the drive shaft (1) is permanently connected with a crankshaft of a prime mover and starting of the transmission takes place via one of the shifting elements.

26. The multiple gear transmission according to claim 25, wherein the fourth clutch (56) is used as a shifting element for starting the transmission.

27. The multiple gear transmission according to claim 1, wherein the shifting elements are one of power shiftable clutches and brakes.

28. The multiple gear transmission according to claim 27, wherein at least one of multi-disc clutches, band brakes and tapered clutches are provided as the shifting elements.

29. A multiple gear transmission of a planetary design for an automatic transmission of motor vehicle, comprising a drive shaft (1) and a driven shaft (2) located in a housing (G), first, second and third planetary gear sets (P1, P2, P3), third, fourth, fifth and sixth rotatable shafts (1, 2, 3, 4, 5, 6) and a first, second, third, fourth, fifth and sixth shifting elements (03, 04, 13, 15, 46, 56), the shifting elements including first and second brakes (03, 04) and first, second, third and fourth clutches (13, 15, 46, 56), and selective engagement of the six shifting elements (03, 04, 13, 15, 46, 56) which produces different reduction ratios between the drive shaft (1) and the driven shaft (2) so that eight forward gears and at least one reverse gear are implemented, the drive shaft (1) is permanently connected with a ring gear of the first planetary gear set (P1) and connectable, via the second clutch (15), with the fifth shaft (5) which is connected with a sun gear of the second planetary gear set (P2) and connectable with the sixth shaft (6), via the fourth clutch (56), the sixth shaft (6) is connected, adjacent one end, with a spider of the first planetary gear set (P1) and adjacent a second end, detachably connectable, via the third clutch (46), with the fourth shaft (4) which is permanently connected with a ring gear of the third planetary gear set (P3) and a spider of the second planetary gear set (P2) and attachable, via the second brake (04), to the housing (G), the driven shaft (2) is connected with a spider of the third planetary gear set (P3), the third shaft (3) is permanently connected with a sun gear of the third planetary gear set (P3) and a ring gear of the second planetary gear set (P2), and the third shaft (3) is detachably connectable, via the first clutch (13), with the drive shaft (1) and attachable, via the first brake (03), to the housing (G), and a sun gear of the first planetary gear set (P1) is non-rotatably connected via a seventh shaft (0) with the housing (G).

* * * * *